(12) United States Patent
Schrum et al.

(10) Patent No.: US 10,112,204 B2
(45) Date of Patent: Oct. 30, 2018

(54) PORTABLE PRESSURIZED SPRAYER

(71) Applicants: Phillip B. Schrum, Clairton, PA (US); Mark A. Verosky, Elizabeth, PA (US); David J. Krygowski, North Huntingdon, PA (US)

(72) Inventors: Phillip B. Schrum, Clairton, PA (US); Mark A. Verosky, Elizabeth, PA (US); David J. Krygowski, North Huntingdon, PA (US)

(73) Assignee: ForeFront Product Design, LLC, Pittsburgh, PA (US)

( * ) Notice: Subject to any disclaimer, the term of this patent is extended or adjusted under 35 U.S.C. 154(b) by 187 days.

(21) Appl. No.: 14/626,260

(22) Filed: Feb. 19, 2015

(65) Prior Publication Data

US 2015/0258558 A1 Sep. 17, 2015

Related U.S. Application Data

(62) Division of application No. 11/983,676, filed on Nov. 9, 2007, now Pat. No. 8,985,482.

(51) Int. Cl.
| | |
|---|---|
| *B05B 7/24* | (2006.01) |
| *B05B 9/04* | (2006.01) |
| *B05B 9/043* | (2006.01) |
| *B05B 9/08* | (2006.01) |
| *F16L 37/00* | (2006.01) |
| *F16L 37/248* | (2006.01) |
| *F16L 37/42* | (2006.01) |

(52) U.S. Cl.
CPC ............ *B05B 7/2491* (2013.01); *B05B 9/043* (2013.01); *B05B 9/0406* (2013.01); *B05B 9/085* (2013.01); *B05B 9/0861* (2013.01); *B05B 9/0883* (2013.01); *F16L 37/008* (2013.01); *F16L 37/248* (2013.01); *F16L 37/42* (2013.01); *Y10T 137/778* (2015.04); *Y10T 137/7779* (2015.04)

(58) Field of Classification Search
CPC ....... B05B 7/2491; B05B 9/043; B05B 9/085; B05B 9/0861; B05B 9/0883
USPC ....... 239/332, 333, 328, 142, 154, 158, 373; 222/401, 61, 608, 333, 334; 285/91, 401, 285/402, 376, 377; 371/614.16, 614.17, 371/614.18
See application file for complete search history.

(56) References Cited

U.S. PATENT DOCUMENTS

| | | |
|---|---|---|
| 1,514,314 A | 11/1924 | Douglas |
| 3,993,245 A | 11/1976 | Smith |
| 4,135,669 A | 1/1979 | Bridges et al. |

(Continued)

*Primary Examiner* — Jason Boeckmann
(74) *Attorney, Agent, or Firm* — Cohen & Grigsby, PC

(57) ABSTRACT

A tank holding a quantity of liquid releasably connects to an electric pump module through a connector to provide a portable sprayer. The tank connects to a feed line that supplies spray nozzle with the liquid. The connector combines a quick disconnect connector with a pressure relief valve. The electric pump module includes an electric pump, a switch assembly, and a check valve. The electric pump module directs gas through the check valve into the connector to increase the gas pressure in the tank and force the liquid in the tank to flow through the feed line and out the spray nozzle. The switch assembly turns off the electric pump when the gas pressure in the tank exceeds a predetermined limit while maintaining the flow of liquid through the spray nozzle.

17 Claims, 10 Drawing Sheets

(56) References Cited

U.S. PATENT DOCUMENTS

| | | |
|---|---|---|
| 4,305,180 A | 12/1981 | Schwartz |
| 4,613,112 A * | 9/1986 | Phlipot ............... F16L 37/22 |
| | | 137/71 |
| 4,651,903 A | 3/1987 | Pagliai |
| 4,703,774 A * | 11/1987 | Seehausen .......... E21B 33/0355 |
| | | 137/614 |
| 4,925,105 A | 5/1990 | Lin |
| 4,984,742 A | 1/1991 | Ellison et al. |
| 5,009,252 A * | 4/1991 | Faughn ............... F16L 37/113 |
| | | 137/614.04 |
| 5,671,884 A | 3/1997 | Restive |
| 5,695,121 A | 12/1997 | Stillions et al. |
| 5,704,659 A | 1/1998 | Lunder |
| 5,716,007 A | 2/1998 | Nottingham et al. |
| 5,752,661 A | 5/1998 | Lewis |
| 5,810,048 A * | 9/1998 | Zeiner-Gundersen ..................... |
| | | F16L 29/04 |
| | | 137/614.04 |
| 5,931,207 A * | 8/1999 | Gianino ............... B05B 9/0805 |
| | | 137/223 |
| 6,109,548 A * | 8/2000 | George ............... B05B 9/0805 |
| | | 222/333 |
| 6,125,879 A | 10/2000 | Prosper et al. |
| 6,135,361 A | 10/2000 | Grassi |
| 6,145,711 A | 11/2000 | Prosper et al. |
| 7,032,841 B1 | 4/2006 | Swisher |
| 7,971,803 B1 | 7/2011 | Barlowe |
| 2004/0079816 A1 * | 4/2004 | Daniel, Jr. ........... B05B 9/0816 |
| | | 239/200 |
| 2006/0076435 A1 | 4/2006 | Hudson et al. |
| 2006/0102245 A1 | 5/2006 | Kaechle |
| 2006/0289679 A1 | 12/2006 | Johnson et al. |

\* cited by examiner

PORTABLE PRESSURIZED SPRAYER

BACKGROUND OF THE INVENTION

1. Field of the Invention

This invention relates a method and apparatus for spraying liquids and, more particularly, to a portable sprayer that includes a detachable electric pumping module and a manual back-up pump.

2. Description of the Related Art

A common item on the market today is a container that is manufactured and sold for spraying liquids. Generally, liquids are sprayed to atomize or to produce fine droplets in the air that impinge on a surface. The number of applications for liquids that are dispensed by spraying is virtually unlimited.

For this reason, many liquids are sold in containers that have an attached hand operated sprayer. The sprayer has a trigger or lever which, when manually activated, atomizes or dispenses liquid in small droplets. These manually-activated sprayers require the user to sequentially squeeze a lever or a trigger. To maintain a uniform spray pattern, a user must operate the lever or trigger rapidly while at the same time moving the container, if a large area is to be covered.

Many liquids are sold in bottles with a removable cap so that a sprayer can be attached to the container with the idea that the hand-held sprayer can be repeatedly used for different containers.

U.S. Pat. No. 7,032,841 discloses a hand-held battery power sprayer assembly having a container and a body. The sprayer assembly also includes a battery powered pump connected in series to a switch and a battery. The switch is actuated by a trigger. A passive check valve member normally closes a passageway preventing fluid flow from the container into the body. The check valve member is displaceable to permit air flow into the container.

U.S. Pat. No. 5,716,007 discloses a battery operated, hand-held fluid dispenser. The dispenser includes a supply container, a pump and discharge unit, and a discharge nozzle. The pump includes a removable battery powered pump drive unit.

U.S. Patent Publication No. 2006/0289679 discloses an interchangeable liquid sprayer that is removably attached to a liquid reservoir. The sprayer includes a discharge nozzle, a manually or electrically powered pump and an actuation mechanism for the pump. The sprayer also includes a quick-release coupling means for attaching the sprayer to a complementary quick-release coupling means fitted to the product reservoir.

Many sprayers are portable home and garden sprayers. Such sprayers are known to include a tank and a manual pumping device threadedly secured to the top of the tank. Such sprayers include "backpack" sprayers that are hand carried or supported by one shoulder strap or on the back in a backpack manner. These sprayers are usually provided with a pump that dispenses liquid from a relatively small volume container and forces the liquid through a manually controlled wand.

U.S. Pat. No. 5,752,661 discloses a backpack sprayer for spraying liquids. The sprayer includes an on board battery that drives a motor/pump assembly for pumping liquid through a manually controlled wand for spraying.

U.S. Pat. No. 4,651,903 discloses a sprayer apparatus having a molded container with a back support panel that is intended for use in abutting relation with the back of a user. The apparatus includes a centrally disposed pressure vessel within the container. The pressure vessel includes a check valve for liquids that enter the vessel. The pressure vessel communicates with a motor operated pump. The motor operated pump replaces a conventional manual pump to pressurize the vessel and direct liquid from the container to a sprayer.

U.S. Pat. No. 5,671,884 discloses an improved backpack sprayer. The sprayer includes a supply tank, an expandable accumulator, a pump mechanism, an intake valve, a discharge valve, and a spray wand with a nozzle. The pump mechanism is positioned adjacent to the bottom of the tank. The pump mechanism pumps fluid from the supply tank to the accumulator. The intake valve enables unidirectional flow from the pump to the accumulator. Fluid is discharged through the discharge valve into the spray wand and nozzle.

A key problem with conventional home and garden sprayers is that the manual pumping device requires the user to manually pump air into the tank to build-up sufficient air pressure within the air space above the liquid to be dispensed. Typically, these manual pumping devices require numerous manual pumping strokes to spray the liquids for just a few seconds. Additional manual pumping is required to re-pressurize the tank for further spraying. The pumping and spraying procedure is continued until the spraying operation is completed. It is evident that this procedure is physically exhausting for the user, is difficult to use, and is very impractical and antiquated.

One approach to solving the problem is elimination of the manual pumping device. U.S. Patent Publication No. 2006/0102245 discloses a pumpless handheld sprayer for use in the lawn and the garden. The sprayer includes a tank with an internal cavity for holding liquids for spraying and a canister that includes pressurized gas. The sprayer also includes a spray wand and a nozzle assembly. The pressurized gas canister communicates with the tank cavity, to pressurize the cavity to force the liquid through the nozzle assembly and spray wand.

Another approach utilizes a battery-operated pump. U.S. Pat. No. 4,925,105 discloses a rechargeable garden sprayer. The sprayer includes a container, a lower suction tube, and an inlet. The inlet cooperates internally with the main body of the container such that liquid poured in through the inlet flows to the container. The garden sprayer also includes, a power unit including a closed-type battery, a socket, a pump, a switch, and a nozzle tube. The nozzle tube is telescopic.

U.S. Pat. No. 3,993,245 discloses a spraying device that includes a spray tank connected through a spray valve to one or more spray nozzles. The spray tank communicates with a charging valve. The charging valve includes means adapted to provide a substantially fluid-tight seal between a container and the charging valve, container attachment means, and container puncturing means.

U.S. Pat. No. 5,695,121 discloses a self contained portable sprayer system that includes a tank for receiving a fluid mixture. The system includes a cyclic air pump that forces air into the tank. The system also includes a pressure release valve that is positioned on the top portion of the tank.

U.S. Pat. No. 6,135,361 discloses a garden sprayer for spraying liquids such as pesticides, fertilizers, and herbicides. The garden sprayer includes a housing holding a reservoir, a conduit, and a pump. The conduit includes a free outer end. A spray nozzle is coupled to the free outer end of the conduit. The spray nozzle has a trigger with a switch for selectively actuating the pump.

A disadvantage with many portable home and garden sprayers is the possibility of the user over pressurizing the tank causing the tank to rupture and possibly injuring the user. Consequently, many sprayers include conventional pressure relief devices.

U.S. Pat. No. 5,931,207 discloses a portable home and garden sprayer that includes a tank having a conventional air pressure gauge and a pressure relief valve. The sprayer also includes a hand held compressed air power unit. The hand held compressed air power unit includes a housing and an air compressor that communicates with the tank. The air compressor directs air into the tank to spray continuously until the tank empties.

U.S. Pat. No. 6,145,711 discloses a portable sprayer having a tank, a head portion, and a pump unit. The pump unit is powered by a motor to pressurize the tank. The pump unit includes a switch that is actuated when the tank pressure gets below a certain threshold to activate the motor. The sprayer also includes a pressure relief device.

U.S. Pat. No. 6,109,548 discloses a sprayer system that has a reservoir, a manual pump, an electric motor, a battery, and an air compressor. The electric motor and the compressor are mounted within an indentation of the reservoir. The electric motor operates the air compressor whenever the air pressure within the reservoir drops below a predetermined level when a pressure switch is closed. When the air pressure within the reservoir rises above a predetermined level, the electric motor is deactivated thereby preventing the reservoir from becoming over-pressurized. The manual pump may be utilized when the electric pump fails or the battery becomes discharged.

SUMMARY OF THE INVENTION

In accordance with the present invention there is provided a pressurized sprayer. A tank holds a quantity of liquid and has an opening to facilitate connection to a feed line for supplying a spray nozzle. An electric pump module releasably connects to the tank through a connector and has an electric pump, a switch assembly, and a check valve. The electric pump module directs gas through the check valve into the connector to increase the gas pressure in the tank and forces the liquid in the tank to flow through the feed line and out the spray nozzle. The switch assembly turns off the electric pump when the gas pressure in the tank exceeds a predetermined limit while maintaining the flow of liquid through the spray nozzle.

Further in accordance with the present invention, there is provided a portable pump assembly for injecting gas into a sprayer tank. A housing for releasable connection to the sprayer tank is provided. Valve means are positioned within said housing for conveying gas to the sprayer tank. Pumping means are positioned within the housing for directing gas through the valve means to pressurize the sprayer tank. Switching means are positioned within the housing for actuating the pumping means and for monitoring the gas pressure of the sprayer tank. A power supply is positioned within said housing for supplying power to the pumping means.

Further in accordance with the present invention, there is provided a method for spraying liquid. A housing is releasably connected to a quick disconnect connector on a sprayer tank that holds a quantity of liquid for spraying. An electric pump positioned within the housing is actuated to pump gas through a check valve, through the quick disconnect connector into the sprayer tank to force the liquid through a nozzle. The pressure within the sprayer tank is monitored to determine when the pressure exceeds a predetermined limit. The pump is switched off after the pressure exceeds the predetermined limit.

Further in accordance with the present invention, there is provided a quick disconnect device for connecting a sprayer tank to a portable pump assembly. A tubular body has an internal passageway for conveying gas between the sprayer tank and the portable pump assembly. A first plunger member is mounted within the internal passageway for reciprocal movement between the sprayer tank and the portable pump assembly. A second plunger member is mounted within the internal passageway for reciprocal movement between the sprayer tank and the portable pump assembly. A first resilient member urges the first plunger member away from the sprayer tank to prevent gas from flowing into the sprayer tank. A second resilient member urges the second plunger member toward the sprayer tank to prevent gas from flowing out of the sprayer tank. The first plunger member moves toward the sprayer tank to overcome the spring constant of the first resilient member to direct gas from the portable pump assembly into the sprayer tank. The internal pressure of the sprayer tank moves the second resilient member to overcome the spring constant of the second resilient member to relieve pressure from the sprayer tank.

Accordingly, a principal object of the present invention is to provide a pressurized sprayer that includes a releasably connected portable pump assembly.

Another object of the present invention is to provide a sprayer that utilizes a quick disconnect connector with an integrated pressure relief valve to connect to a portable pump assembly.

Another object of the present invention is to provide a pressurized sprayer that includes an electric pump module with a mechanism that shuts off the pump when the internal pressure of the sprayer exceeds a predetermined limit.

A further object of the present invention is to provide a method for spraying that utilizes a modular pump assembly that includes a quick disconnect connector with an integrated pressure relief valve.

Another object of the present invention is to provide a pressurized sprayer that includes an electric pump module that pumps gas into a tank to facilitate spraying of liquid from the tank.

These and other objects of the present invention will be more completely described and disclosed in the following specification, accompanying drawings, and appended claims.

DESCRIPTION OF THE PREFERRED EMBODIMENTS

Figure 1:
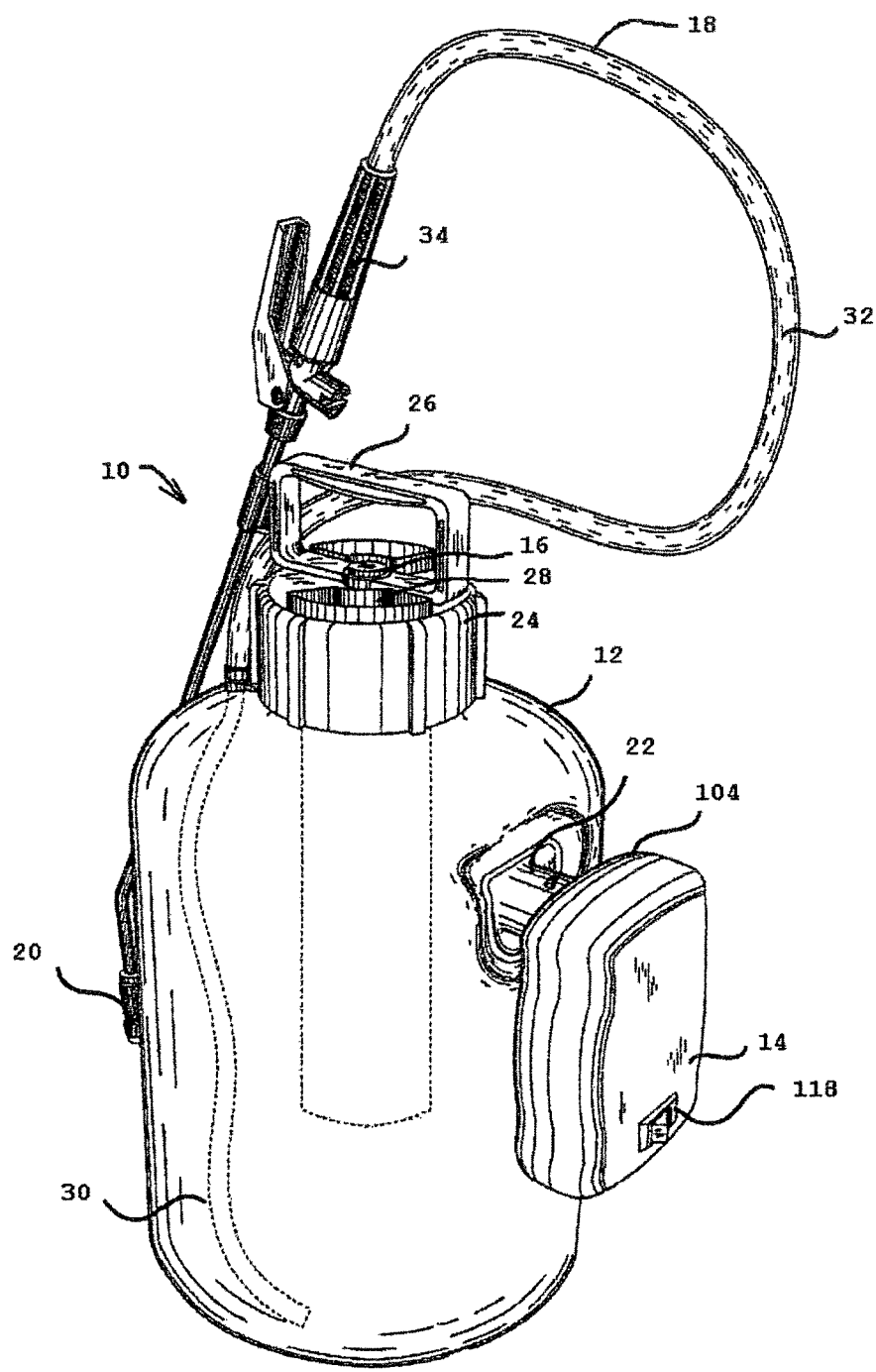
FIG. 1 is an isometric view of a portable pressurized sprayer, illustrating a detachable, portable pump assembly releasably connected to a sprayer tank.

Referring to the drawings and, particularly, to FIG. 1, there is illustrated a portable pressurized sprayer generally designated by the numeral 10, particularly adapted for spraying liquids from a tank 12. The tank 12 serves as a reservoir for storing various liquids to allow the sprayer 10 to function as a multi-purpose sprayer. The sprayer 10 includes both a portable pump assembly 14 in fluid communication with the tank 12 and a manual pump 16 that is threadedly connected to the tank 12. The portable pump assembly 14 is an electric pump module or a power pack assembly.

The sprayer 10 includes the tank 12, the portable pump assembly 14, the manual pump 16, a feed mechanism 18, and a spray nozzle 20. The portable pump assembly 14 is a self-contained, separately assembled module or unit that transports gas to the tank 12 through a connector 22 that extends outwardly from the wall of the tank 12. The connector 22 releasably connects the portable pump assembly 14 to the tank 12 without transferring liquids from the interior of the tank 12 to the portable pump assembly 14. Preferably, the portable pump assembly 14 pumps air through the connector 22.

The tank 12 holds a selected quantity of liquid. The portable pump assembly 14 directs air through the connector 22 into the tank 12 to increase the air pressure in the tank 12 to force the liquid to flow through the feed mechanism 18 and out of the spray nozzle 20. The portable pump assembly 14 compresses the air within the interior of the tank 12 without compressing the liquid contained therein.

The portable pump assembly 14 maintains the flow of liquid through the spray nozzle 20 and has the ability to stop pumping air into the tank 12 when the air pressure in the tank 12 exceeds a predetermined limit. The ability of the portable pump assembly 14 to shut off the flow of air to the tank 12 enhances the safety of the sprayer 10. This function also conserves energy and increases the life of the individual components of the sprayer 10.

The connector 22 transports air into and out of the sprayer tank 12. The connector 22 includes an integral pressure relief mechanism. The connector 22 discharges excess air from the interior of the tank 12 to relieve excess pressure from sprayer 10 when a second, predetermined pressure value limit within the tank 12 is exceeded.

The manual pump 16 includes a screw cap 24, a handle 26, and a shaft 28. The screw cap 24 is threadedly connected to the top of the tank 12. The shaft 28 extends through the cap 24 to allow the manual pump to communicate with the interior of the tank 12. The handle 26 is positioned on the top of the shaft 28.

Liquid is discharged from the tank 12 by operation of the manual pump 16 to inject air into the tank 12, forcing the liquid to flow through the feed mechanism 18 and out of the spray nozzle 20. The manual pump 16 is utilized primarily when the portable pump assembly 14 is inoperable or disconnected from the sprayer tank 12. The manual pump handle 26 is also utilized to facilitate carrying of the sprayer 10. Alternatively, the sprayer 10 includes a strap (not shown) to facilitate carrying.

Figure 2:
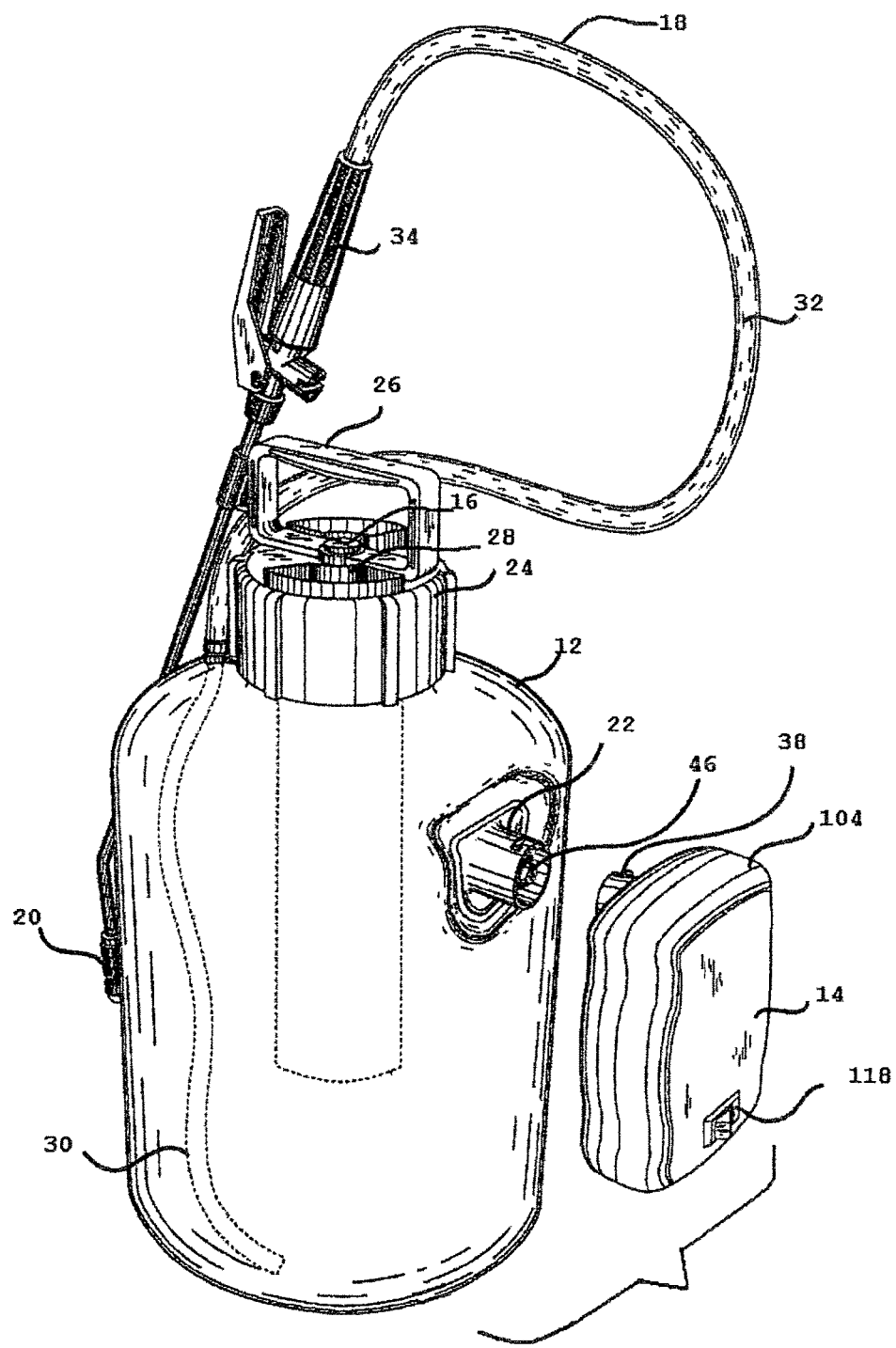
FIG. 2 is an isometric view of the portable pressurized sprayer shown in FIG. 1, illustrating the portable pump assembly disconnected from the sprayer tank.
Figure 3:
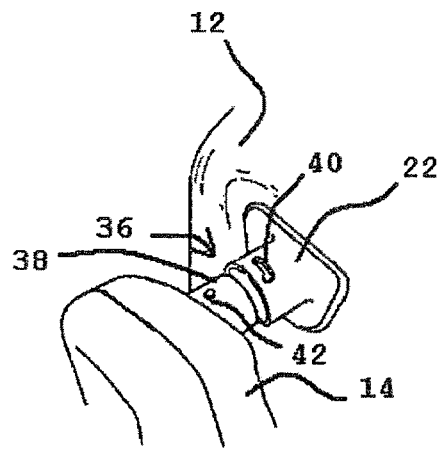
FIG. 3 is a fragmentary isometric view of the portable pump assembly positioned for connection to the sprayer tank.
Figure 4:
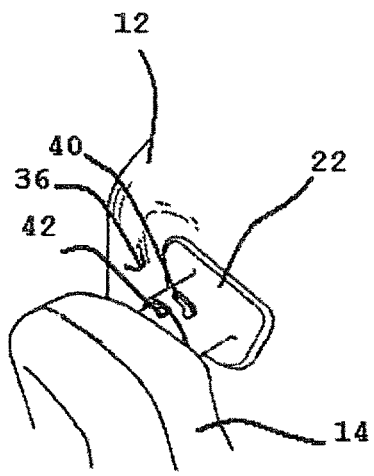
FIG. 4 is a fragmentary isometric view similar to FIG. 3, illustrating insertion of a tube extending from the portable pump assembly into connection with the sprayer tank.
Figure 5:
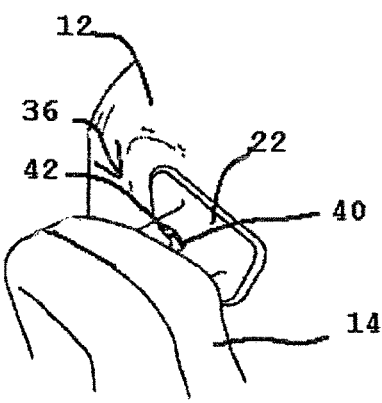
FIG. 5 is a fragmentary isometric view similar to FIG. 4, illustrating the initial engagement of the portable pump assembly with the sprayer tank.
Figure 6:
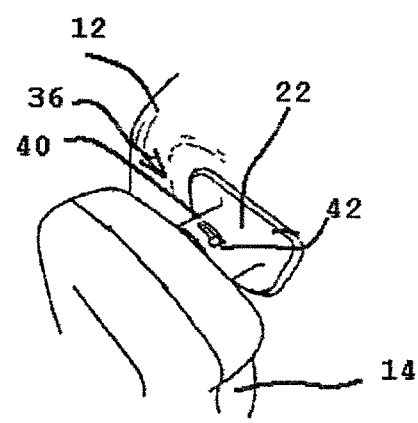
FIG. 6 is a fragmentary isometric view similar to FIG. 5, illustrating the portable pump assembly releasably connected to the sprayer tank.

The feed mechanism 18 connects the tank 12 and the nozzle 20 to facilitate transfer of liquids from the tank 12 for spraying. As shown in FIGS. 1 and 2, the feed mechanism 18 includes a flexible feed line 30, a spray wand 32, and a spray handle 34. The feed line 30 is in fluid communication with the tank 12.

The tank 12, the portable pump assembly 14, the manual pump 16, the feed mechanism 18, and the spray nozzle 20 are made from any suitable materials through any suitable manufacturing process. Preferably, the tank 12 is made from polyethylene.

Referring now to FIGS. 2-6, the connector 22 is a tubular quick disconnect connector that facilitates the rapid connection and removal of the portable pump assembly 14 from the tank 12. The connector 22 also relieves excess pressure from the tank 12 when the internal pressure of the tank 12 exceeds a predetermined level to facilitate safe storage of the tank 12.

The connector 22 includes quick disconnect means or a locking mechanism generally designated by the numeral 36 shown in FIGS. 3-6 for facilitating the connection and release of the portable pump assembly 14 from the tank 12. The locking mechanism 36 holds the portable pump assembly 14 in an essentially upright position upon connection to the tank 12. The locking mechanism 36 stabilizes the portable pump assembly 14 by limiting the rotation of the portable pump assembly 14 after it is connected to the sprayer tank 12.

As shown in FIGS. 3-6, the portable pump assembly 14 is connected to the sprayer tank 12 by aligning the connector 22 with an essentially cylindrical tube 38 extending from the portable pump assembly 14. The tube 38 inserts into connector 22 to actuate the locking mechanism 36 to releasably connect the portable pump assembly 14 to the tank 12.

The locking mechanism 36 is a conventional key-in-slot connection mechanism for releasably attaching the sprayer tank 12 to the portable pump assembly 14. The locking mechanism 36 includes a first slot 40 that is positioned on an upper section of the connector 22 and a second, opposing slot (not shown) that is positioned on a lower section of the connector 22. The locking mechanism 36 also includes a first key 42 that is positioned on an upper section of the tube 38 and a second, opposing key (not shown) that is positioned on a lower section of the tube 38. The key 42 is a mating body that has a predetermined diameter to fit into the slot 40.

The slot 40 has predetermined length that extends along a portion of the circumference of the connector 22 to limit the angle upon which the portable pump assembly 14 can rotate after being connected to the tank 12. Preferably, the slot 40 is a J-slot, so that rotation of the portable pump assembly 14 relative to the tank 12 is limited further.

Referring now to FIGS. 7-10, the connector 22 has the ability to provide a quick disconnect connection and includes an integrated pressure relief mechanism. The connector 22 includes an essentially tubular housing 44, an internal quick connect plunger member 46, a pressure relief plunger member 48, a quick connect resilient member 50, and a pressure relief resilient member 52. The housing 44 includes an internal passageway 54 for transporting air into of the sprayer tank 12. A plurality of o-rings 56, 58, 60, 62 are positioned within the internal passageway 54 to facilitate sealing.

The internal quick connect plunger member 46, the pressure relief plunger member 48, the quick connect resilient member 50 and the pressure relief resilient member 52 are positioned within the internal passageway 54. The plunger members 46, 48 are positioned in biased positions within the internal passageway 54.

The internal quick connect plunger member 46 moves laterally within the tubular body or housing 44 to allow air to flow from the portable pump assembly 14 shown in FIG. 1 to the tank 12. The pressure relief plunger member 48 also moves laterally within the tubular housing 44 to allow air to flow to relieve pressure from the sprayer tank 12.

Figure 7:
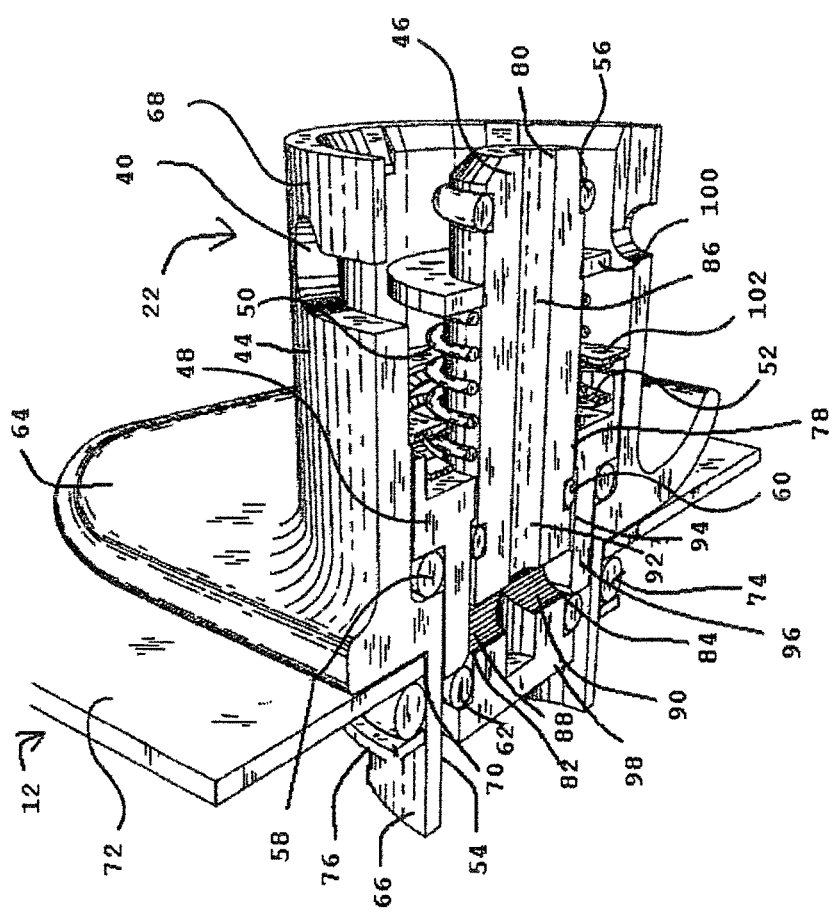
FIG. 7 is a fragmentary isometric sectional view of a quick disconnect connector for connecting a portable pump assembly to a sprayer tank, illustrating an integral pressure relief mechanism.

As illustrated in FIG. 7, the tubular housing 44 includes a flanged portion 64 positioned between two cylindrical tubular portions 66, 68. The tubular portion 66 inserts through an opening 70 in a side wall 72 of the sprayer tank 12 until the flanged portion 64 abuts the side wall 72. An o-ring 74 is positioned on the opposite side of the side wall 72 to seal the opening 70. A retainer ring 76 holds the connector 22 in place.

The tubular portion 68 extends outwardly from the wall 72 in a transverse direction. The flanged portion 64 extends along an outer surface of the wall 72 to stabilize the connector 22 and to facilitate connection of the connector 22 to the tank 12. The internal passageway 54 extends through the tubular portions 66, 68.

The internal passageway 54 provides fluid communication between the interior of the sprayer tank 12 and the portable pump assembly tube 38 shown in FIGS. 2-6. The internal passageway 54 also transports air from the tank 12 when the plunger member 48 moves laterally to overcome the spring constant of the resilient member 52.

As shown in FIG. 7, the plunger members 46, 48 are mounted in the internal passageway 54 for reciprocal movement in an axial direction. The plunger member 46 is mounted within the interior of the plunger member 48. The plunger member 48 abuts a portion 78 of the exterior of the plunger member 46.

The quick connect plunger member 46 is an essentially cylindrical tubular member that has an opening 80 positioned at one end and a pair of openings 82, 84 at the opposite end. The plunger member 46 also includes an internal bore 86 communicating with the opening 80. The bore 86 intersects at a right angle with a pair of channels 88, 90 that communicate with the openings 82, 84 to form an internal pathway or passageway 92 for transporting air.

The pressure relief plunger member 48 is an essentially cylindrical tubular member that has an internal passageway 94. The plunger member 46 is mounted within the plunger member internal passageway 94 for reciprocal movement from a biased, closed position to an open position. The plunger member 48 includes a portion 96 that abuts an o-ring 62 to form a seal for closing the quick connect plunger member passageway 92 positioned in a lower portion 98 of the quick connect plunger member 46.

The o-ring 62 abuts the plunger member 48 when the plunger member 46 is in the closed position to seal the openings 82, 84 and close the passageway 92. The plunger member portion 96 separates the o-ring 62 from the plunger member 48 when the plunger member 46 moves from the closed position to the open position to open the passageway 92.

Figure 8:
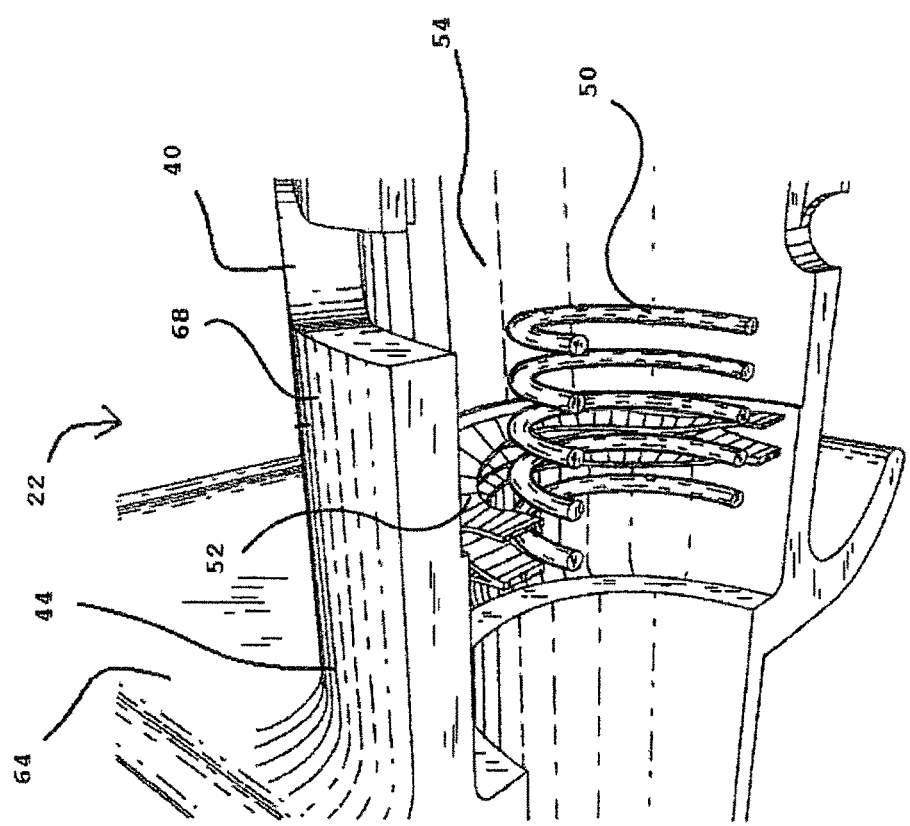
FIG. 8 is a fragmentary isometric sectional view of a pair of resilient members positioned within the quick disconnect connector illustrated in FIG. 7.

Referring now to FIGS. 7-8, the resilient members 50, 52 are springs. Preferably, the resilient member 50 is a helical spring that is positioned to move the plunger member 46 within the connector passageway 54. The resilient member 52 is a wave spring that is positioned to move the plunger member 48 within the connector passageway 54. The use of a wave spring provides compactness.

The resilient member 50 is positioned on the plunger member 46 between a retainer ring 100 and the plunger member 48. The resilient member 52 surrounds the resilient member 50 in a concentric manner and is positioned between the plunger member 48 and a retainer ring 102.

Figure 9:
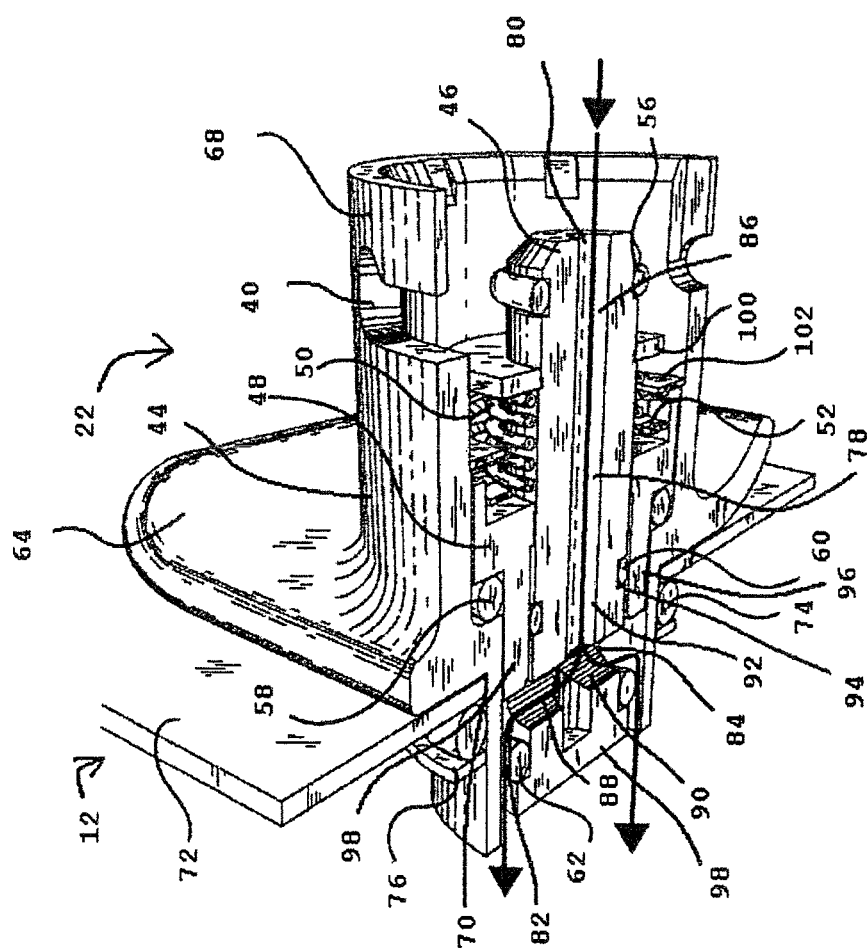
FIG. 9 is a fragmentary isometric sectional view of the pathway of air entering a sprayer tank through the quick disconnect connector illustrated in FIG. 7.

Referring now to FIG. 9, the plunger member 46 is pushed by the portable pump assembly 14 to allow fluid to flow into the sprayer tank 12 during connection. In the alternative, the plunger member 46 is manually or mechanically pushed to discharge the sprayer tank 12 of excess air in the absence of a connection with the portable pump assembly 14.

The plunger member 46 is pushed in a lateral direction from a biased, closed position to allow air to enter the sprayer tank 12. The resilient member 50 urges the retainer ring 100 away from the interior of the spray tank 12 when the plunger member 46 is in the biased, closed position. The plunger member 46 moves laterally toward the spray tank 12 to overcome the spring constant of the resilient member 50 to allow the plunger member passageway 92 to direct air into the sprayer tank 12.

The plunger member 46 slides against the plunger member 48, so that the plunger member 48 separates from the o-ring 62 to uncover the openings 82, 84 to allow air to flow from the portable pump assembly 14 through the connector 22 into the interior of the sprayer tank 12.

Alternatively, excess air is discharged through the connector passageway 92 by mechanically or manually moving the quick connect plunger member 46 to overcome the spring constant of the resilient member 50 in an axial direction. This motion moves the quick connect plunger member 46 relative to the pressure relief plunger member 48, so that the plunger member 48 does not cover the openings 82, 84. The o-ring 62 also separates from the plunger member 48 to allow air to flow through the passageway 92 and out of the tank 12.

Figure 10:
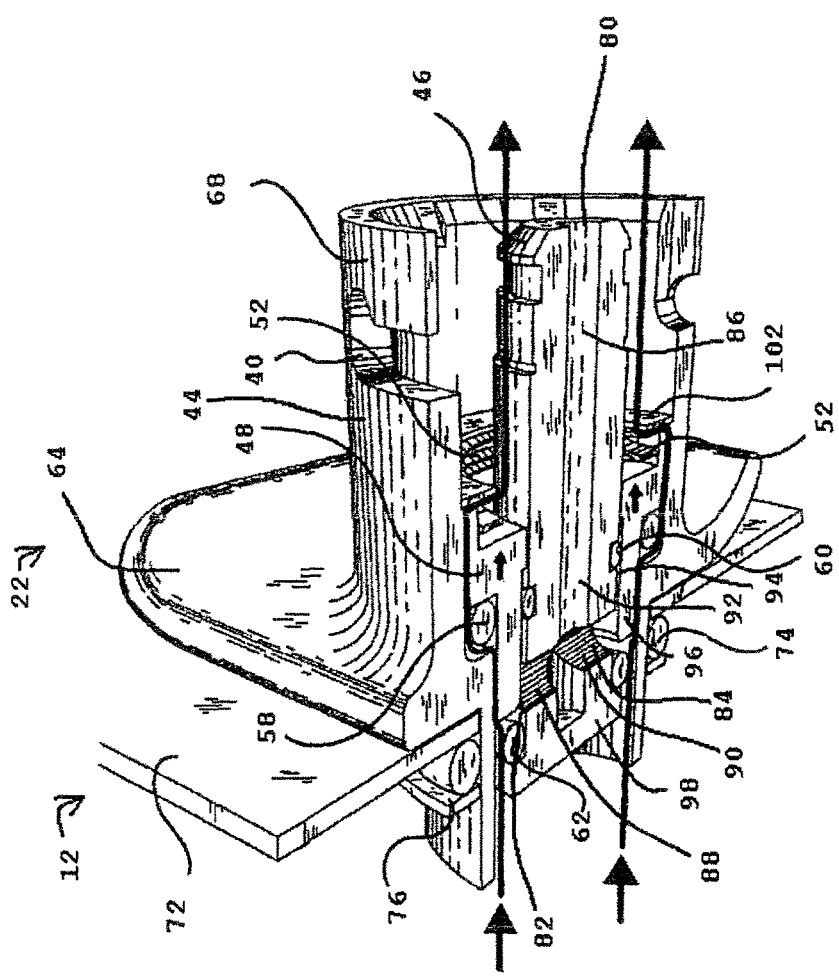
FIG. 10 is a fragmentary isometric sectional view of the pathway of air escaping the sprayer tank through the quick disconnect connector illustrated in FIG. 7 during pressure relief operations.

Referring now to FIG. 10, the resilient member 52 is mounted within the connector internal passageway 54 between the pressure relief plunger member 48 and the retainer ring 102. The resilient member 52 responds to pressure from within the interior of the sprayer tank 12 to allow excess air to discharge through the passageway 54 and around the exterior of the plunger member 48 within the connector 22.

The resilient member 52 urges the plunger member 48 toward the interior of the sprayer tank 12 when the plunger member 48 is in its initial biased, closed position. The pressure within the sprayer tank 12 overcomes the spring constant of the resilient member 52 to urge the plunger member 48 laterally. The plunger member 48 separates from the o-ring 58 to allow air to flow around the plunger member 48 and through the passageway 54. The air flows from the sprayer tank 12 and out of the sprayer 10.

Figure 11:
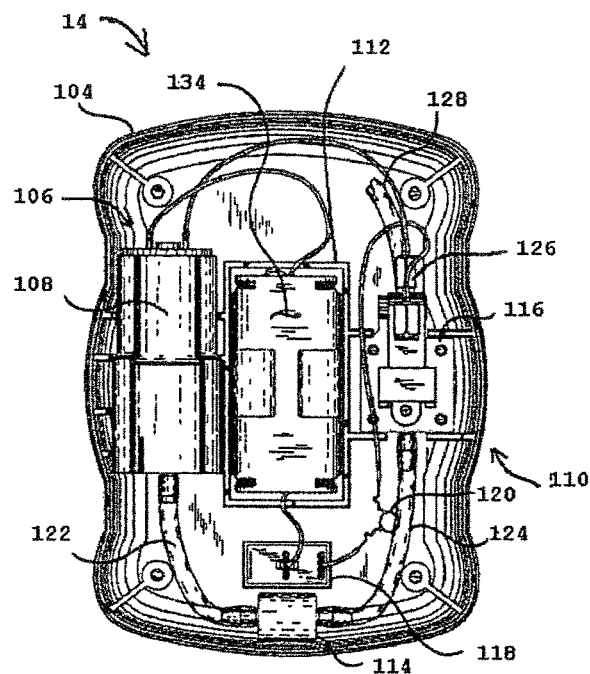
FIG. 11 is an elevational view of the interior of the portable pump assembly illustrated in FIGS. 1 and 2.
Figure 12:
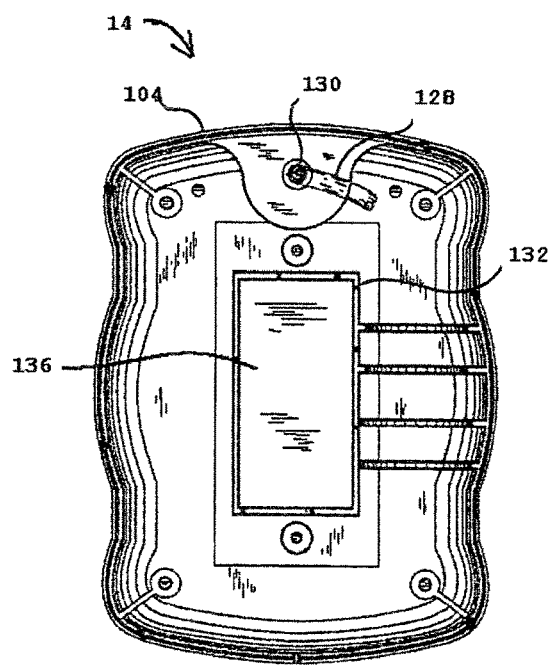
FIG. 12 is an elevational view of the back of the portable pump assembly illustrated in FIG. 11.

Referring now to FIGS. 11-12, the portable pump assembly 14 is a lightweight unit that includes a housing 104 for holding an internal pump mechanism generally designated by the numeral 106. The pump mechanism 106 includes an electric air pump 108, a switch assembly generally designated by the numeral 110, a power supply 112, and a valve assembly 114. In one embodiment, the valve assembly 114 is a check valve.

The air pump 108 is electrically coupled to the switch assembly 110 and the power supply 112. The power supply 112 provides power to the air pump 108 until the switch assembly 110 turns off the air pump 108.

The switch assembly 110 includes an air pressure switch 116, an on/off switch 118, and a fuse assembly 120. The air pressure switch 116 has the ability to monitor the pressure within the portable pump assembly 14. The air pressure switch 116 also prevents the internal pressure of the tank 12 from exceeding a predetermined limit, so that the internal pressure never reaches an unsafe level.

The air pressure switch 116 is operable to actuate the air pump 108. The air pressure switch 116 shuts off the air pump 108 when the internal pressure in the tank 12 shown in FIG. 1 reaches a predetermined limit. In this manner, the life of the power supply 112 and the electric air pump 108 is extended The on/off switch 118 actuates the portable pump assembly 14. The on/off switch 118 is a conventional on/off switch that allows a user to turn on or to manually shut off the portable pump assembly 14. The fuse assembly 120 includes a resettable fuse that provides over current protection during power surges.

As shown in FIGS. 11-12, the electric pump 108 connects to the check valve 114 through tubing 122 to transport pressurized air to the supply tank 12 shown in FIG. 1. Tubing 124 connects the check valve 114 to the air pressure switch 116. The air pressure switch 116 transports the pressurized air through a nipple 126 into tubing 128. Tubing 128 extends through an opening 130 in the housing 104 to transport air through the pump module 14 and into the tank 12, as shown in the embodiment illustrated in FIG. 1.

Now referring to FIGS. 11-12, the power supply 112 is a conventional portable power supply device for operating the portable pump assembly 14 in environments in which access to electrical power sources is limited. The power supply 112 includes a compartment 132 that holds a device 134 for storing power. The compartment 132 includes a door 136 that allows access to the power storing device 134 through the housing 104.

Figure 13:
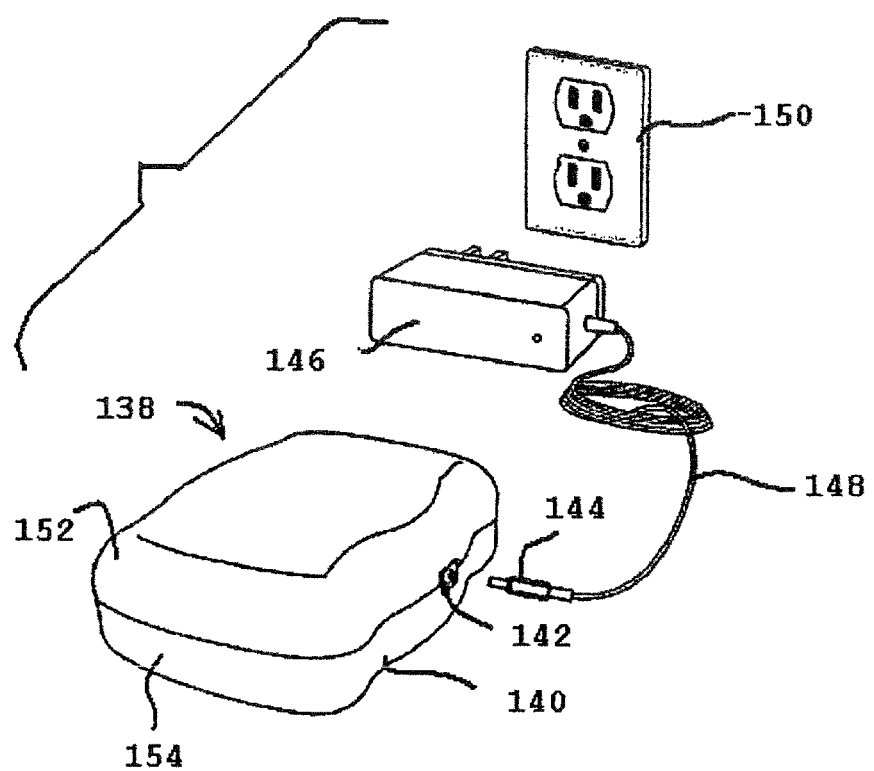
FIG. 13 is an exploded isometric view of another embodiment of the portable pump assembly for recharging.

Referring now to FIG. 13, there is illustrated another embodiment of the portable pump assembly generally designated by the numeral 138. Contrary to the embodiment shown in FIGS. 1-12, the portable pump assembly 138 includes a rechargeable battery pack (not shown) positioned within a housing 140. The housing 140 does not include the compartment 132 or the door 136 shown in FIGS. 11-12.

The portable pump assembly 138 includes a port 142 to facilitate recharging. The portable pump assembly 138 connects to a plug 144 that is connected to a transformer 146 through a cable 148. The transformer 146 inserts into a wall outlet 150, so that the wall outlet 150 transmits power to the power storing device (not shown) within the housing 140.

The housing 140 includes an upper half 152 and a lower half 154 that are releasably connected to one another through a conventional connecting device. The two halves 152, 154 separate from one another to provide access to the rechargeable battery pack (not shown) and to the other internal components of the portable pump assembly 138.

Figure 14:
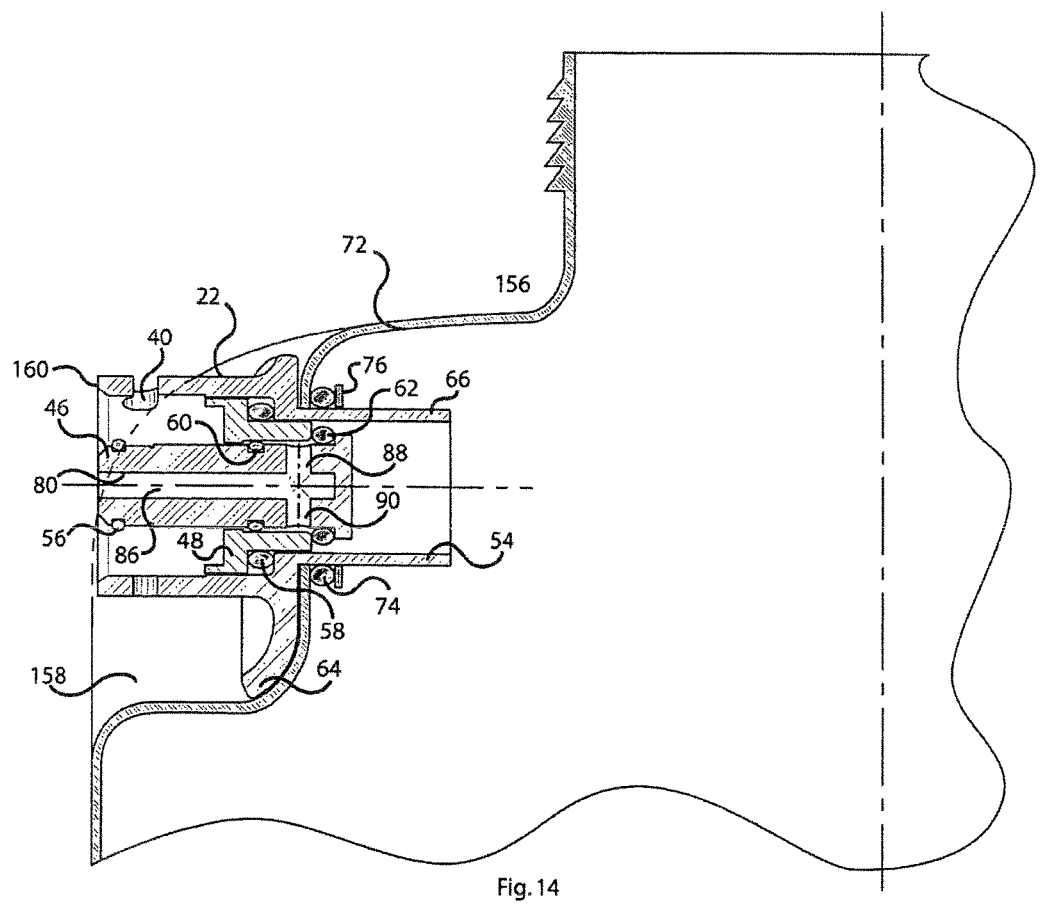
FIG. 14 is an enlarged fragmentary view of another embodiment of the sprayer tank illustrating a recessed connector.

Referring now to FIG. 14, there is illustrated another embodiment of a sprayer tank generally designated by the numeral 156. In comparison with the embodiment of the sprayer tank 12 shown in FIGS. 1-12, the sprayer tank 156 includes a recess 158 in the tank wall 72 for receiving the connector 22.

The connector 22 is positioned within the recess 158 so that an outer edge 160 of the connector 22 does not protrude from the periphery of the outer surface of the sprayer tank 156. The positioning of the connector 22 within the recess 158 prevents the plunger member 46 shown in FIGS. 7-10 from being unintentionally depressed in the event the sprayer tank 156 is tipped over and the connector 22 is impacted. This prevents the sprayer tank 156 from discharging prematurely.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. A method for spraying a liquid, the method comprising:
releasably connecting a housing of a detachable electric pump module to a sprayer tank with a connector of the sprayer tank and without transferring liquids from an interior of the sprayer tank to the detachable electric pump module, wherein the sprayer tank holds a liquid for spraying and the housing can be connected or disconnected while the sprayer tank is pressurized;
actuating an electric pump positioned within the housing of the detachable electric pump module to pump gas through a check valve of the connector into the sprayer tank to force the liquid through a spray nozzle, the detachable electric pump module automatically maintaining a flow of the liquid through the spray nozzle;
monitoring a pressure within the sprayer tank to determine when the pressure exceeds a predetermined limit using an automatic switch assembly; and
switching the electric pump off after the pressure within the sprayer tank exceeds the predetermined limit using the automatic switch assembly,
wherein the connector automatically prevents over pressurization and relieves excess pressure when the pressure within the sprayer tank exceeds the predetermined limit, and automatically resets after normal operating pressure is resumed, independent of whether the housing of the detachable electric pump module is connected to the sprayer tank or disconnected from the sprayer tank.

2. The method as set forth in claim 1, comprising:
supplying power to the electric pump with a portable power supply through the automatic switch assembly.

3. The method as set forth in claim 1, comprising:
supplying power to the electric pump with a battery through the automatic switch assembly.

4. The method as set forth in claim 1, comprising:
disconnecting the housing of the detachable electric pump module from the connector of the sprayer tank while the sprayer tank is pressurized; and
automatically discharging excess gas from the sprayer tank through an integrated automatic pressure relief valve housed within the connector when the pressure within the sprayer tank exceeds the predetermined limit.

5. A method for spraying a liquid, the method comprising:
releasably connecting a housing of an electric pump module to a sprayer tank via a connector on the sprayer tank without transferring liquids from an interior of the sprayer tank to the electric pump module; and actuating an electric pump positioned within the housing of the electric pump module to pump a gas through a first flow path of the connector into the sprayer tank to increase a pressure within the sprayer tank, wherein an automatic switch assembly of the electric pump module monitors an internal pressure of the sprayer tank to determine when the internal pressure exceeds a predetermined limit, and when the internal pressure exceeds the predetermined limit, the automatic switch assembly automatically turns off power to the electric pump, and wherein the housing of the electric pump module can be connected or disconnected from the sprayer tank while the sprayer tank is pressurized, and the connector automatically relieves excess pressure from the sprayer tank and automatically resets after normal operating pressure is resumed independent of whether the housing of the electric pump module is connected or disconnected from the sprayer tank.

6. The method as set forth in claim 5, comprising:

supplying power to the electric pump with a portable power supply through the automatic switch assembly.

7. The method as set forth in claim 5, comprising:

supplying power to the electric pump with a battery through the automatic switch assembly.

8. The method as set forth in claim 5, wherein the connector automatically relieves excess pressure from the sprayer tank by discharging excess gas through an integrated pressure relief valve housed within the connector.

9. The method as set forth in claim 5, comprising:

disconnecting the housing of the electric pump module from the connector on the sprayer tank while the sprayer tank is pressurized.

10. The method as set forth in claim 5, comprising:

disconnecting the housing of the electric pump module from the connector on the sprayer tank while the sprayer tank is pressurized; and manually discharging the excess gas from the sprayer tank through the connector by depressing a plunger member of the connector.

11. The method of claim 5, wherein the increased pressure within the sprayer tank forces a liquid contained therein through a spray nozzle.

12. A method for spraying a liquid, the method comprising:

releasably connecting a housing of an electric pump module to a sprayer tank via a connector on the sprayer tank without transferring liquids from an interior of the sprayer tank to the electric pump module; and actuating an electric pump positioned within the housing of the electric pump module to pump a gas through a first flow path of the connector into the sprayer tank to increase a pressure within the sprayer tank, wherein an automatic switch assembly of the electric pump module monitors an internal pressure of the sprayer tank to determine when the internal pressure exceeds a predetermined limit, and when the internal pressure exceeds the predetermined limit, the automatic switch assembly automatically turns off power to the electric pump, wherein the housing of the electric pump module can be connected or disconnected while the sprayer tank is pressurized, and wherein the connector automatically relieves excess pressure from the sprayer tank by discharging excess gas through a second flow path comprising an integrated pressure relief valve housed within the connector, the connector automatically resetting after normal operating pressure is resumed, independent of whether the housing of the detachable electric pump module is connected to the sprayer tank or disconnected from the sprayer tank.

13. The method as set forth in claim 12, comprising:

supplying power to the electric pump with a portable power supply through the automatic switch assembly.

14. The method as set forth in claim 12, comprising:

supplying power to the electric pump with a battery through the automatic switch assembly.

15. The method as set forth in claim 12, comprising:

disconnecting the housing of the electric pump module from the connector on the sprayer tank while the sprayer tank is pressurized, wherein, when the internal pressure of the sprayer tank exceeds the predetermined limit, the connector automatically discharges the excess gas from the sprayer tank through the second flow path.

16. The method as set forth in claim 12, comprising:

disconnecting the housing of the electric pump module from the connector on the sprayer tank while the sprayer tank is pressurized; and manually discharging the excess gas from the sprayer tank through the first flow path of the connector by depressing a plunger member of the connector.

17. The method of claim 12, wherein the increased pressure within the sprayer tank forces a liquid contained therein through a spray nozzle.

* * * * *